Figure 1:
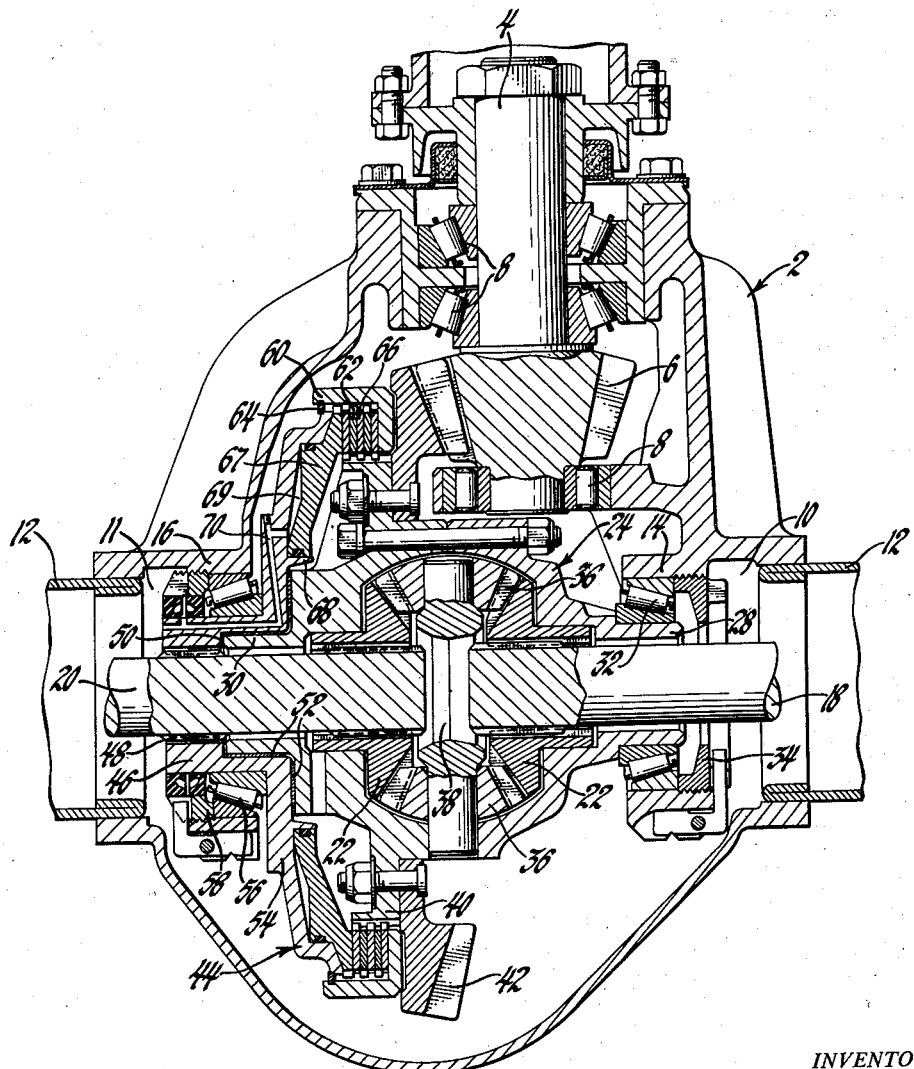

July 14, 1959    R. H. SCOTT    2,894,416
FLUID LOCK DIFFERENTIAL

Filed July 25, 1957    2 Sheets-Sheet 1

INVENTOR.
Robert H. Scott
BY
R. P. Barnard
ATTORNEY

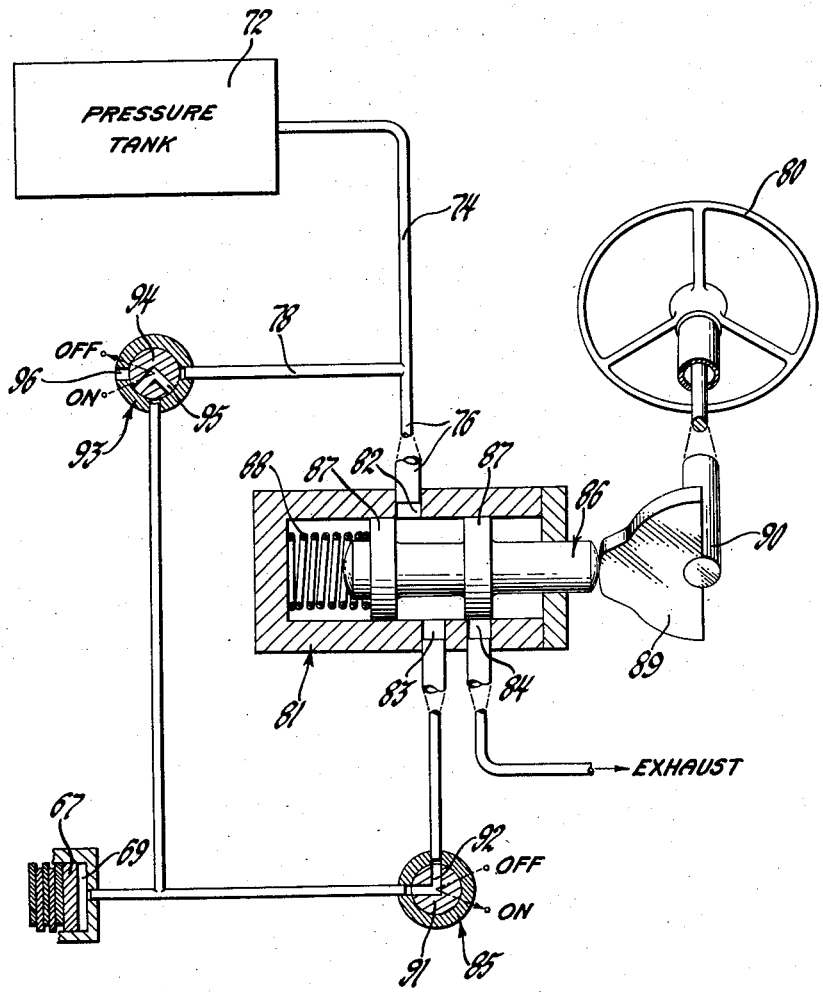

United States Patent Office 2,894,416
Patented July 14, 1959

2,894,416

FLUID LOCK DIFFERENTIAL

Robert H. Scott, Cleveland, Ohio, assignor to General Motors Corporation, Detroit, Mich., a corporation of Delaware Application July 25, 1957, Serial No. 674,199

6 Claims. (Cl. 74—710.5)

The present invention relates to differentials and, more specifically, to fluid lock differentials for use particularly in heavy duty off-the-road earth-moving equipment.

To equip heavy duty material handling vehicles, such as large capacity trucks, scrapers and the like, with a conventional differential construction offers serious disadvantages when the vehicle operates under unstable soil conditions, which is the usual case. While the usual differential action is desirable in these vehicles, loss of drive and tractive effort from one of the wheels also results, perhaps for only short intervals of time, as the vehicle traverses soil which is wet or otherwise rendered unstable. Under such circumstances, for example, one drive wheel may at least momentarily lose traction resulting, through the action of the differential and this wheel taking all of the power input, in spinning of the wheel and at least momentary complete loss of traction. Since such conditions frequently occur, and particularly in such vehicles as herein specifically contemplated, it is desirable to provide a differential which can be selectively locked to transmit power equally to all wheels mounted on the axle shaft or shafts.

Therefore, it has become increasingly more apparent that some means is desirable in a conventional differential for locking the latter selectively as required or desired to avoid the aforementioned loss of traction. On the other hand, it is also desirable to provide a locking means which may be easily incorporated with existing differential constructions of conventional size.

It is, therefore, a feature and object of the present invention to provide a differential construction which may be selectively locked to transmit equal power to all the wheels mounted on the drive axle or axles.

According to another feature of this invention, the differential construction herein contemplated is not of an inordinate size and may be easily incorporated in existing differential housings normally employed with the heavy duty equipment aforementioned.

A more specific feature and object of this invention resides in providing a novel bearing means for supporting the differential within its housing in such a manner as to absorb all the usual thrust induced therein, while permitting the mounting of a differential locking multiple disc clutch within the housing without materially enlarging the latter, if at all.

Moreover, according to another feature and object of this invention, fluid pressure means is provided for manually or automatically actuating the multiple disc clutch of the differential locking means.

In general, these and other features of this invention are obtained in a substantially conventional type of differential comprising a differential cage having rotatably journalled therein a plurality of differential pinions, and oppositely disposed face or side gears in mesh with the differential pinions and secured to coaxial outwardly projecting wheel-driving axle shafts. A multiple disc fluid-actuated clutch is positioned within the differential housing and includes clutch elements carried, respectively, by the differential cage and one of the wheel-driving shafts whereby, upon actuating the clutch, the differential pinions and face gears will be locked together. Of particular significance is the fact that one of the clutch elements is carried by an annular wall splined to a wheel-driving shaft and forming in part a housing for the clutch. Moreover, as will appear hereinafter, a novel means is provided for controlling fluid actuation of the clutch either automatically in accordance with steering movement of the vehicle equipped with such a differential or manually as desired by the vehicle operator.

These and other features, objects and advantages of this invention will appear more fully hereinafter as the description of the invention proceeds, and in which reference is made to the following drawings in which:

Figure 1 is a cross section of the fluid lock differential of this invention; and Figure 2 is a schematic representation of the fluid system for controlling the differential of Figure 1.

Referring now to the drawing, and particularly Fig. 1, there is shown a differential housing 2 through the forward end of which a drive shaft 4 projects and on the inner end of which there is secured a bevel pinion 6. The shaft 4 is suitably journalled in the roller bearings 8 as clearly shown in Fig. 1. Oppositely disposed openings 10 and 11 are formed in the differential housing 2, and the axle housings 12 project outwardly therefrom. The housing 2 includes axially inwardly directed annular pilot portions 14 and 16 in alignment with and adjacent the housing openings 10 and 11.

The coaxial wheel-driving axle shafts 18 and 20 extend through the axle housings 12 into the interior of the housing 2. Each shaft has a bevel face or side gear 22 splined or otherwise suitably secured thereon. The differential cage 24 includes oppositely disposed annular axially outwardly extending support, bearing or nose portions 28 and 30 which closely surround the axle shafts 18 and 20 outboard of the respective face gears 22. A plurality of roller bearing elements 32 are interposed between the cage support portion 28 and the pilot portion 14 of the housing 2 substantially within the opening 10 in the latter thereby supporting this end of the differential cage. A nut 34 is threadably received within the opening 10 in the housing to adjust the position of the bearing members 32. Suitable bearing washers (not shown) may be provided between the inner wall of the differential cage 24 and the mating surfaces of the face gears 22 as desired. The usual differential bevel gears 36 are rotatably journalled on a spider member 38 secured within the differential cage, and engage the face gears 22.

The differential cage includes an annular flange 40 to which the ring gear 42 is bolted. As is usual, the ring gear is in mesh with the drive pinion 6. An annular wall 44 has an axially extending shoulder portion 46 suitably secured as by splines at 48 to the wheel-driving shaft 20 substantially within the housing opening 11. The nose or support portion 30 of the differential cage is supported in the recess 50 in the wall 44 adjacent the splined portion 46. Suitable bearing or wear washers 52 are interposed between adjacent faces of the differential cage and the splined portion 46 and radially outwardly extending portion 54 of the wall 44. A plurality of roller bearing elements 56 are interposed between the splined portion 46 of the wall 44 and the pilot portion 16 of the housing 2 substantially within the housing opening 11 thereby supporting this end of the differential cage and the wall 44. Again, a threaded nut 58 is received within the opening 11 in the housing to adjust the position of the bearing elements 56.

As appears clearly from Fig. 1, the intermediate portion 54 of the wall 44 is axially spaced from the adjacent flange 40 of the cage and the ring gear 42 bolted thereto. An annular retaining ring 60 for the clutch elements 62 is suitably secured to the outer periphery of the wall 44 as by the snap ring 64, the clutch elements 62 being adapted for cooperation in the usual manner with similar elements 66 splined or otherwise secured to the flange 40 for rotation with the differential cage. An annular clutch-applying piston 67 is seated upon an annular shoulder 68 formed integral with the intermediate portion 54 of the wall 44 and forms a fluid pressure chamber 69 with this portion of the wall. A fluid passage 70 is cast within the wall 44 for supplying fluid to the pressure chamber 69. Although not shown, this passage 70 may be supplied through any suitable port formed through the wall of the housing 2 or elsewhere as desired.

It will therefore be seen that application of fluid pressure to the chamber 69 will lock the elements 62 and 66, thereby locking the differential cage to the wall 44 which is splined to the axle shaft 20. Since the differential cage is operatively connected to the differential pinions 36 and the face gear 22 is secured to the shaft 20 and in mesh with the differential pinions, the entire differential will be locked thereby supplying power through both axle shafts.

The control means for supplying fluid under pressure to the chamber 69 is shown more specifically in Fig. 2 and comprises a pressure tank 72 filled with any suitable fluid under pressure. For example, in a vehicle employing air brakes, it may be convenient to use air as the control fluid. Similarly, if hydraulic brakes are used, hydraulic fluid may be conveniently employed. The pressure tank 72 communicates through the fluid line 74 and either one of two parallel circuits 76 and 78 with the pressure chamber 69. The circuit 76 is adapted to automatically control the locking action of the differential in accordance with steering movement of the steering wheel 80, while the circuit 78 is adapted to control the differential locking means wholly selectively and manually as desired by the vehicle operator.

Therefore, it will be seen that a steering control valve 81 having an inlet port 82, an outlet port 83, and an exhaust port 84, and an over-control valve 85 are placed in series in the circuit 76. The steering control valve includes a valve plunger 86 having axially spaced lands 87 thereon for selectively controlling communication between the outlet port 83 and the inlet port 82 and exhaust port 84 leading to a return tank or atmosphere if air is used as the controlling medium. A spring 88 mounted within the valve 81 normally biases the plunger 86 to the right in Fig. 2 until it engages a suitable operating mechanism, herein shown to be the cam 89 fixedly secured to the steering column 90 which is rotated through steering movement of the wheel 80. The steering wheel 80 is shown in the position which it would occupy with the vehicle travelling straight ahead; that is, fluid pressure would be supplied through the steering control valve 81 and the over-control valve 85, if the latter is in the "on" position, to lock the differential. Thereafter, if the vehicle is turned, it is desirable to have normal differential action. Accordingly, upon turning the steering wheel 80, the cam 89 will ride off the plunger 86 thereby allowing the spring 88 to move the plunger to the right in Fig. 2 to close the circuit from the inlet port 82 to the port 83 and open an exhaust circuit from the port 83 to the port 84. Upon the steering wheel being returned to the straight ahead position, it will be apparent that the differential will again be locked.

The over-control valve 85 includes an operating member 91 having a passage 92 therein which, in the position shown, allows fluid to flow in either direction through the circuit 76, as controlled by the steering valve 81. If the vehicle operator desires to disable the automatic control system, he need only place the over-control valve 85 in the "off" position at which time no fluid can flow through the circuit 76 irrespective of the position of the steering wheel 80.

In a situation in which the automatic differential locking circuit 76 is disabled due to the over-control valve 85 being in the "off" position, the vehicle operator may still control locking of the differential through the selector valve 93 which includes an operating member 94 having a passage 95 therein which may selectively open the circuit 78 or place the chamber 69 in communication with a return tank or atmosphere through the exhaust port 96. Thus, to lock the differential, the operator places the selector valve 93 in the "on" position thereby opening the circuit 78 to apply fluid to the chamber 69. When the need for a locked differential no longer exists, the selector valve may then be placed in the "off" position to exhaust the fluid from the chamber 69.

One specific form of a differential and fluid pressure operating means therefor has been shown for the purpose of illustrating this invention. However, it will be appreciated that other forms of the invention will be obvious to those skilled in the art. Accordingly, it will be understood that the invention is not to be limited to the specific form illustrated, but only by the scope of the claims which follow.

I claim:

1. In combination, a differential housing having oppositely disposed openings therein, coaxial wheel-driving shafts extending from the interior of said housing through and spaced from said openings, a differential drive mechanism disposed within said housing and including a differential cage rotatably mounted on the axis of said shafts, said cage having oppositely disposed bearing portions surrounding said shafts within said housing openings, means for supporting one end of said cage including bearing means interposed between one of said bearing portions and said housing within one of said openings, an annular wall adjacent the other end of said differential cage and including a shoulder splined to one of said wheel-driving shafts within said other housing opening, said shoulder including an interior recess adjacent said one wheel-driving shaft for receiving the other of said differential cage bearing portions, means for supporting said wall and said other cage bearing portion including bearing means interposed between said cage shoulder and said housing within said other opening, said wall being rotatable with said one wheel-driving shaft relative to said differential cage and forming with the latter a clutch housing, a disc clutch disposed within said housing and including annular elements respectively connected to said cage and said wall, an annular piston disposed within said housing and forming with said wall a fluid pressure chamber, and fluid pressure means for selectively supplying fluid to said chamber to lock said differential.

2. In combination with a differential comprising driving and driven gears and wheel-driving shafts secured to said driven gears, a selectively engageable clutch including elements operatively secured respectively to said driving and driven gears, and fluid pressure means including a piston for applying said clutch to lock said differential; said fluid pressure means comprising a source of fluid under pressure, a fluid circuit communicating said source to said piston, a normally open valve in said circuit, operating means for said valve automatically responsive to turning steering movement to close said circuit and exhaust fluid from said piston, and a manually operable over-control valve in series with said steering valve for selectively closing said circuit and preventing exhaust of fluid from said piston.

3. In combination with a differential comprising driving and driven gears and wheel-driving shafts secured to said driven gears, a selectively engageable clutch including elements operatively secured respectively to said driving and driven gears, and fluid pressure means including a piston for applying said clutch to lock said differential; said fluid pressure means comprising a source of fluid under pressure, parallel fluid circuits communicating said source to said piston, a normally open valve in one of said circuits, operating means for said valve automatically responsive to turning steering movement to close said one circuit and exhaust fluid from said piston, an over-control valve in series with said steering valve for selectively closing said one circuit, and a selector valve in the other circuit including means for opening said circuit and for closing said circuit to exhaust fluid from said piston, said circuits being controllable independently of each other.

4. In combination with a differential comprising driving and driven gears and wheel-driving shafts secured to said driven gears, a selectively engageable clutch including elements operatively secured respectively to said driving and driven gears, and fluid pressure means including a piston for applying said clutch to lock said differential; said fluid pressure means comprising a source of fluid under pressure, parallel fluid circuits communicating said source to said piston, a normally open valve in one of said circuits automatically responsive to turning steering movement to close said one circuit and exhaust fluid from said piston, a manually operable over-control valve in series with said steering valve for selectively closing said one circuit, and a manually operable selector valve in the other circuit including means for opening said circuit and for closing said circuit to exhaust fluid from said piston.

5. A fluid lock differential comprising driving means, driven means including a differential cage operatively connected to said driving means, differential pinion gears rotatably disposed in said cage, side gears operatively meshing with said differential gears, coaxial wheel-driving shafts secured to said side gears and projecting in opposite directions from said cage, a wall secured to one of said shafts, said wall having a portion spaced from said driven means and forming therewith a clutch housing, a disc clutch disposed within said clutch housing, said clutch comprising cooperating clutch elements secured to said wall and said driven means, a piston disposed between said clutch and said wall and forming with the latter a pressure chamber, and fluid pressure means for selectively applying said piston to said elements to lock said differential; said fluid pressure means comprising a source of fluid under pressure, fluid circuit means communicating said source with said chamber, a normally open valve in said circuit means automatically responsive to turning steering movement to close said circuit and exhaust fluid from said chamber, and a manually operable over-control valve in series with said steering valve for selectively closing said circuit and preventing exhaust of fluid from said piston.

6. A fluid lock differential comprising driving means, driven means including a differential cage operatively connected to said driving means, differential pinion gears rotatably disposed in said cage, side gears operatively meshing with said differential gears, coaxial wheel-driving shafts secured to said side gears and projecting in opposite directions from said cage, a wall secured to one of said shafts, said wall having a portion spaced from said driven means and forming therewith a clutch housing, a disc clutch disposed within said clutch housing, said clutch comprising cooperating clutch elements secured to said wall and said driven means, a piston disposed between said clutch and said wall and forming with the latter a pressure chamber, and fluid pressure means for selectively applying said piston to said elements to lock said differential; said fluid pressure means comprising a source of fluid under pressure, parallel fluid circuits communicating said source with said chamber, a normally open valve in one of said circuits automatically responsive to turning steering movement to close said one circuit and exhaust fluid from said chamber, a manually operable over-control valve in series with said steering valve for selectively closing said one circuit, and a manually operable selector valve in the other of said circuits including means for opening said other circuit and closing said circuit to exhaust said chamber.

References Cited in the file of this patent

UNITED STATES PATENTS

| 2,720,866 | Maki | Oct. 18, 1955 |
| 2,768,538 | Limonds | Oct. 30, 1956 |
| 2,803,149 | Pringle | Aug. 20, 1957 |
| 2,803,150 | Fisher | Aug. 20, 1957 |
| 2,830,670 | Ferguson | Apr. 15, 1958 |

FOREIGN PATENTS

| 459,638 | Germany | May 7, 1928 |